US 7,571,486 B2

(12) United States Patent
Lam

(10) Patent No.: US 7,571,486 B2
(45) Date of Patent: Aug. 4, 2009

(54) SYSTEM AND METHOD FOR PASSWORD PROTECTING AN ATTRIBUTE OF CONTENT TRANSMITTED OVER A NETWORK

(75) Inventor: Arthur K. T. Lam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 848 days.

(21) Appl. No.: 11/096,942

(22) Filed: Mar. 29, 2005

(65) Prior Publication Data

US 2006/0230459 A1 Oct. 12, 2006

(51) Int. Cl.
G06F 17/30 (2006.01)
(52) U.S. Cl. ...................................................... 726/26
(58) Field of Classification Search ................. 713/183, 713/165, 170, 193; 726/26, 28, 31; 705/51, 705/59
See application file for complete search history.

(56) References Cited

U.S. PATENT DOCUMENTS

| 6,948,174 B2 * | 9/2005 | Chiang et al. ............... 719/319 |
| 2002/0049580 A1 * | 4/2002 | Kutaragi et al. ................ 704/1 |
| 2002/0172367 A1 * | 11/2002 | Mulder et al. ............... 380/277 |
| 2002/0186258 A1 * | 12/2002 | Shibata ........................ 345/838 |
| 2003/0074356 A1 * | 4/2003 | Kaler et al. ..................... 707/9 |
| 2003/0097596 A1 * | 5/2003 | Muratov et al. ............. 713/202 |
| 2003/0217275 A1 * | 11/2003 | Bentley et al. ............... 713/184 |
| 2004/0054584 A1 * | 3/2004 | Boon ........................... 705/14 |
| 2004/0088174 A1 * | 5/2004 | Agrawal et al. ................ 705/1 |
| 2004/0093515 A1 * | 5/2004 | Reeves, Jr. ................... 713/201 |
| 2004/0148356 A1 * | 7/2004 | Bishop et al. ............... 709/206 |
| 2004/0184064 A1 * | 9/2004 | TaKeda et al. ............. 358/1.13 |
| 2005/0022229 A1 * | 1/2005 | Gabriel et al. ................ 725/28 |
| 2005/0108549 A1 * | 5/2005 | Kanai .......................... 713/182 |
| 2005/0204130 A1 * | 9/2005 | Harris ......................... 713/165 |
| 2005/0278390 A1 * | 12/2005 | Kaler et al. .................. 707/200 |
| 2006/0036934 A1 * | 2/2006 | Fujiwara ..................... 715/500 |
| 2006/0080316 A1 * | 4/2006 | Gilmore et al. ................ 707/9 |
| 2007/0198563 A1 * | 8/2007 | Apparao et al. ............. 707/101 |

* cited by examiner

Primary Examiner—Beemnet W Dada
(74) Attorney, Agent, or Firm—Merchant & Gould; Ryan T. Grace

(57) ABSTRACT

System and methods for password protecting an attribute of content transmitted over a network. Content such as a text file, an audio file, a video file, and the like, sent over a network is protected by a password. A sender setting up the protection may determine which attribute of the content is to be protected by the password. Attributes that may be protected include time to access, number of accesses, permission to forward, permission to store, and the like. In a time to view example, the received content may self-destruct unless the receiver enters the password within a specified time period. Protection may be set up such that every time the receiver attempts to access the content, the password has to be re-entered. Access by an unauthorized user who may have possession of the computing device with the received content is prevented by content level protection.

14 Claims, 4 Drawing Sheets

SYSTEM AND METHOD FOR PASSWORD PROTECTING AN ATTRIBUTE OF CONTENT TRANSMITTED OVER A NETWORK

BACKGROUND OF THE INVENTION

With the proliferation of networking, exchange of documents of all types between various types of devices and applications has become very common. Typical examples include exchange of text, audio, and video files via email, downloading of files using File Transfer Protocol (FTP), and video or audio streaming over networks. Mobile devices allow users to quickly access email and other attached contents outside of home and office space.

The increased use of content exchange over secure and unsecure networks also increases the risk of leaking confidential information to unintended users. Methods such as public/private key encryption, device or application level password protection, and cryptographic digital signatures provide protection for exchanged content to some degree. However, there is still a significant risk of confidential information being accessed by unintended users when they gain possession of the receiver device such as a Personal Digital Assistant (PDA).

One protection method provided by Information Right Management (IRM) allows sender to specify how content receiver access the information. However, IRM technology grants information rights by checking the receiver's email address and matches the address with a sender-predefined list. If any unintended user picks up the lost device, they may be able to access the information by getting information through the device mailbox.

SUMMARY OF THE INVENTION

Aspects of the present invention relate to a system and method for making content provided to a user subject to a password requirement that affects attributes of the content. Content such as a text file, an audio file, a video file, and the like, sent over a network is protected by a password. The password protection provided by the present invention is unique because it may be applied on a per attribute basis. A sender setting up the protection may determine which attribute of the content is to be protected by the password.

Attributes that may be protected include time to access, number of accesses, permission to forward, permission to store, and the like. For example, a document transmitted by a sender may be encoded with a password that enables the receiver to view the document during a specified time period. The user may view the document only after entering the correct password each time. Once the specified time period has expired, the document is destroyed preventing a risk of the document being accessed by an unintended user.

In accordance with one aspect of the present invention, a computer-implemented method for protecting content exchanged over a network is provided. The method includes selecting an attribute for protection and associating a password with the selected attribute. The password is stored within the content, and a user action with relation to the content is dependent on the user's possession of the password.

According to another aspect, a computer-readable medium having computer instructions for password protecting a document on a mobile device is provided. The instructions include receiving a password protected document and requesting a user attempting to access the document to provide the password. The instructions further include enabling access to the document based on an attribute associated with the password, if the provided password is correct. Otherwise, the instructions include destroying the document.

According to a further aspect, a system for protecting content exchanged over a network is provided. The system includes a sender that is arranged to select an attribute for protection and associate a password with the selected attribute. The password is stored within the content, and a user action with relation to the content is dependent on the user's possession of the password. The system further includes a receiver that is arranged to receive the password protected content and request the user attempting to access the content to provide the password. The receiver is further arranged to enable access to the content based on the attribute associated with the password if the provided password is correct. Otherwise, the receiver is arranged to destroy the content.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
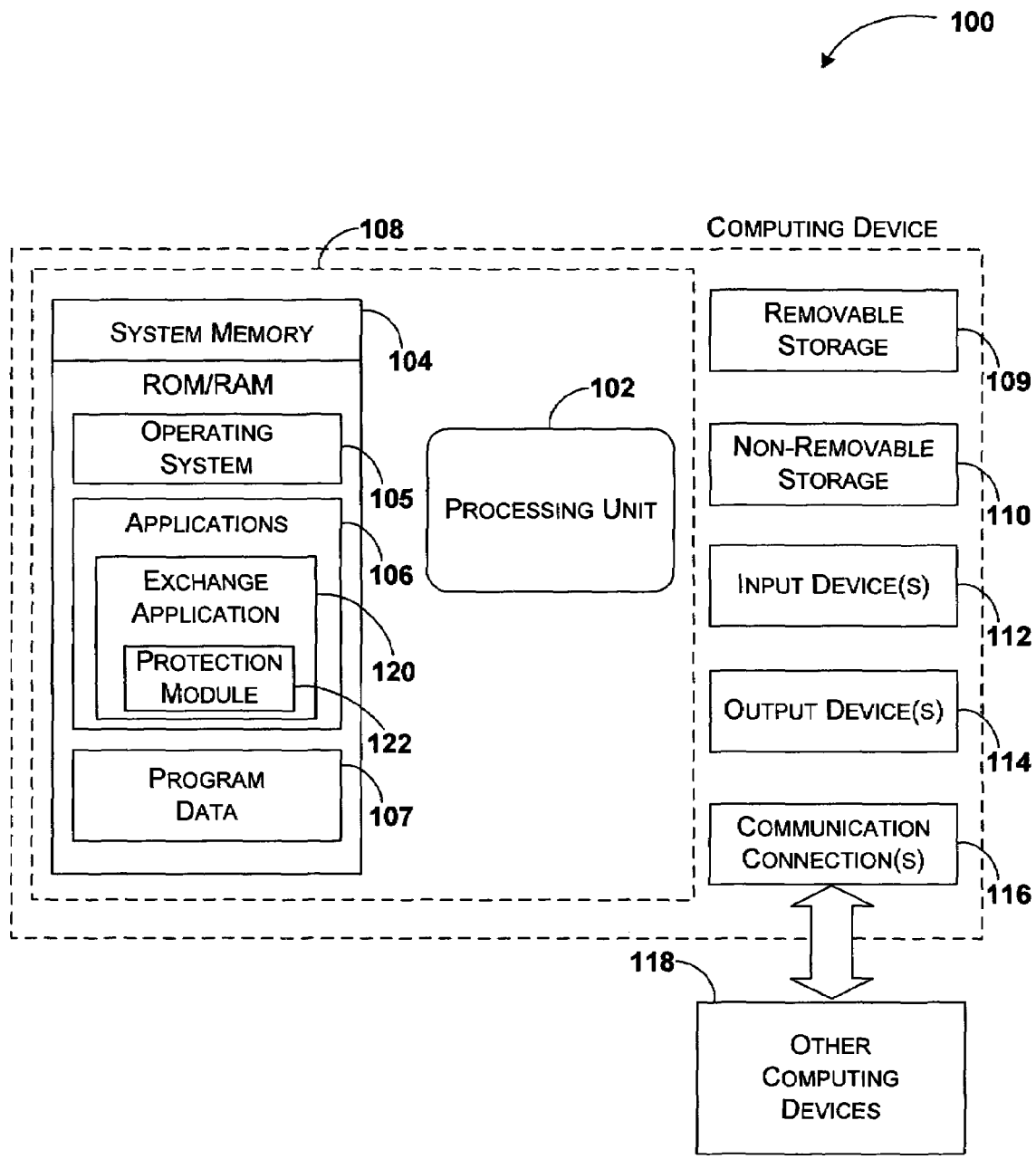
FIG. 1 illustrates a computing device that may be used according to an example embodiment.

Referring to FIG. 1, an example system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one embodiment, applications 106 further include exchange application 120, which provides content exchange services between computer device 100 and other computing devices over a network. Exchange application 120 may include email applications, audio file transfer applications, video file transfer applications, and the like. Exchange application 120 may be configured to receive content from other devices, to send content to other devices, or a combination of the two functionalities. In one embodiment, exchange application 120 may include protection module 122. Protection module 122 may render one or more protection services for received and transmitted content such as encryption, password protection, and the like. The functionality represented by exchange application 120 may be further supported by additional input devices, 112, output devices 114, and communication connection(s) 116 that are included in computing device 100 for protecting content exchanged over the network.

Illustrative Embodiments for Password Protecting an Attribute of Content Transmitted Over a Network Embodiments of the present invention are related to protecting content exchanged over a network. Content such as a text file, an audio file, a video file, and the like, is transmitted over the network employing a variety of applications. Examples include, but are not limited to, attachments to emails, streaming video or audio applications, ftp file downloads, and the like. While methods such as encryption may provide protection at a connection level, the content may be accessed by unintended users once it is in the receiving device.

The present disclosure describes a method whereby an attribute of content transmitted over a network is password protected. A sender setting up the protection may determine which attribute of the content is to be protected by the password. Attributes that may be protected include time to access, number of accesses, permission to forward, permission to store, and the like. In a time to view example, the received content may self-destruct unless the receiver enters the password within a specified time period. Protection may be set up such that every time the receiver attempts to access the content, the password has to be re-entered. Access by an unauthorized user who may have possession of the computing device with the received content is prevented by content level protection.

According to one embodiment, multiple passwords may be employed to protect different attributes independently. In another embodiment, password protection of the content may be used as an extension of an IRM system.

Entities sending and receiving the content may include mobile and stationary devices such as desktop PC's, laptop PC's, PDA's, or applications such webmail.

Figure 2:
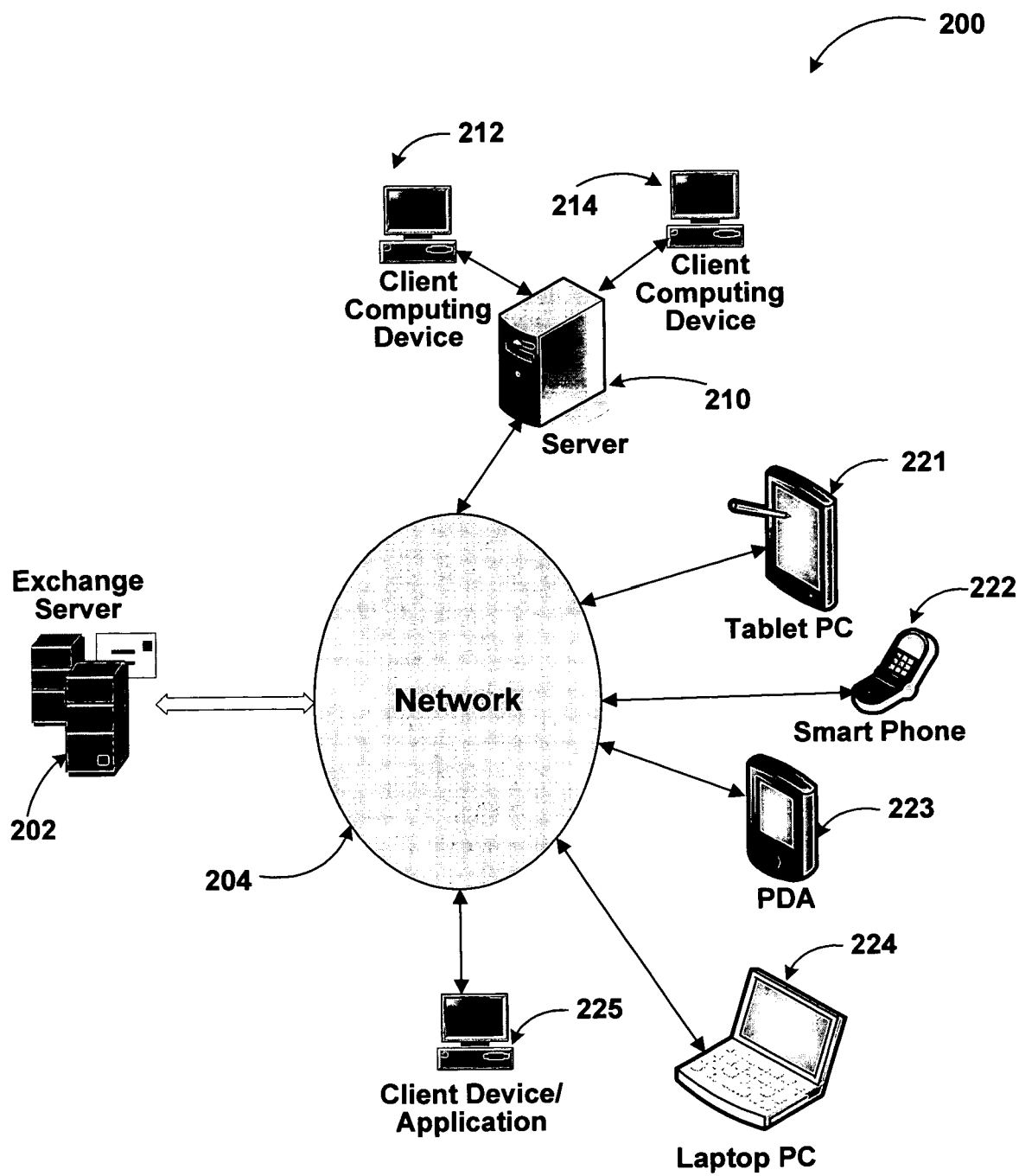
FIG. 2 illustrates an example system of sender and receiver devices exchanging content over a network, where one example embodiment of password protecting transmitted content may be implemented.

FIG. 2 illustrates example system 200 of sender and receiver devices exchanging content over a network, where one example embodiment of password protecting transmitted content may be implemented.

System 200 may comprise any topology of servers, clients, Internet service providers, and communication media. Also, system 200 may have a static or dynamic topology without departing from the spirit and scope of the present invention.

System 200 includes at least one exchange server 202, which provides services to other nodes of network 204 that may include client devices 221-225 directly connected to network 204 such as tablet PC 221, smart phone 222, PDA 223, laptop PC 224, and client device/application 225. Nodes of network 204 may further include client computing devices 212 and 214, which are connected to a subnet managed by server 210 and connect to network 204 through server 210. Services provided by exchange server 202 may depend on a type of exchange application and network 208. Exchange applications may include email applications, file transfer applications, audio streaming applications, video streaming applications, and other applications, where content is transferred to a recipient. Protection mechanisms implemented by exchange server 202 and participants in the exchange of the content may vary depending on whether network 204 is a secure network such an enterprise network, or an unsecure network such as a wireless open network.

In one embodiment, nodes of network 204 may act as sender of content, receiver of content, or both. For example, a user employing laptop PC 224 my send an email message including a protected document to another user in possession of smart phone 222. Smart phone 222 may include an email application that is arranged to download emails from exchange server 202. The email application may be protected by password entry. Once the password for the email application is entered, however, all received email is downloaded and available on smart phone 222. Accordingly, if the owner of smart phone 222 were to lose the phone, whoever finds the phone can have access to the downloaded email content including the protected content compromising the security of the system.

In one example embodiment of the present invention, sender of the content over network 204 may include password protection within the content, such as metadata of a text file. The password may be associated with an attribute of the content such as time to access. For time to access attribute, the sender specifies a time period, within which the recipient has to enter the password in order to access the content. If the recipient fails to enter the correct password within the specified time period, the content may be destroyed (e.g. deleted from temporary storage of smart phone 222 etc.). The protection may further be set up such that every time the recipient attempts to re-access the content, they have to provide the correct password again.

Network 204 provides communication between the nodes described above. By way of example, and not limitation, network 204 may include wired media such as a wired network or direct-wired connection, and wireless media such as acoustic, RF, infrared and other wireless media.

Figure 3:
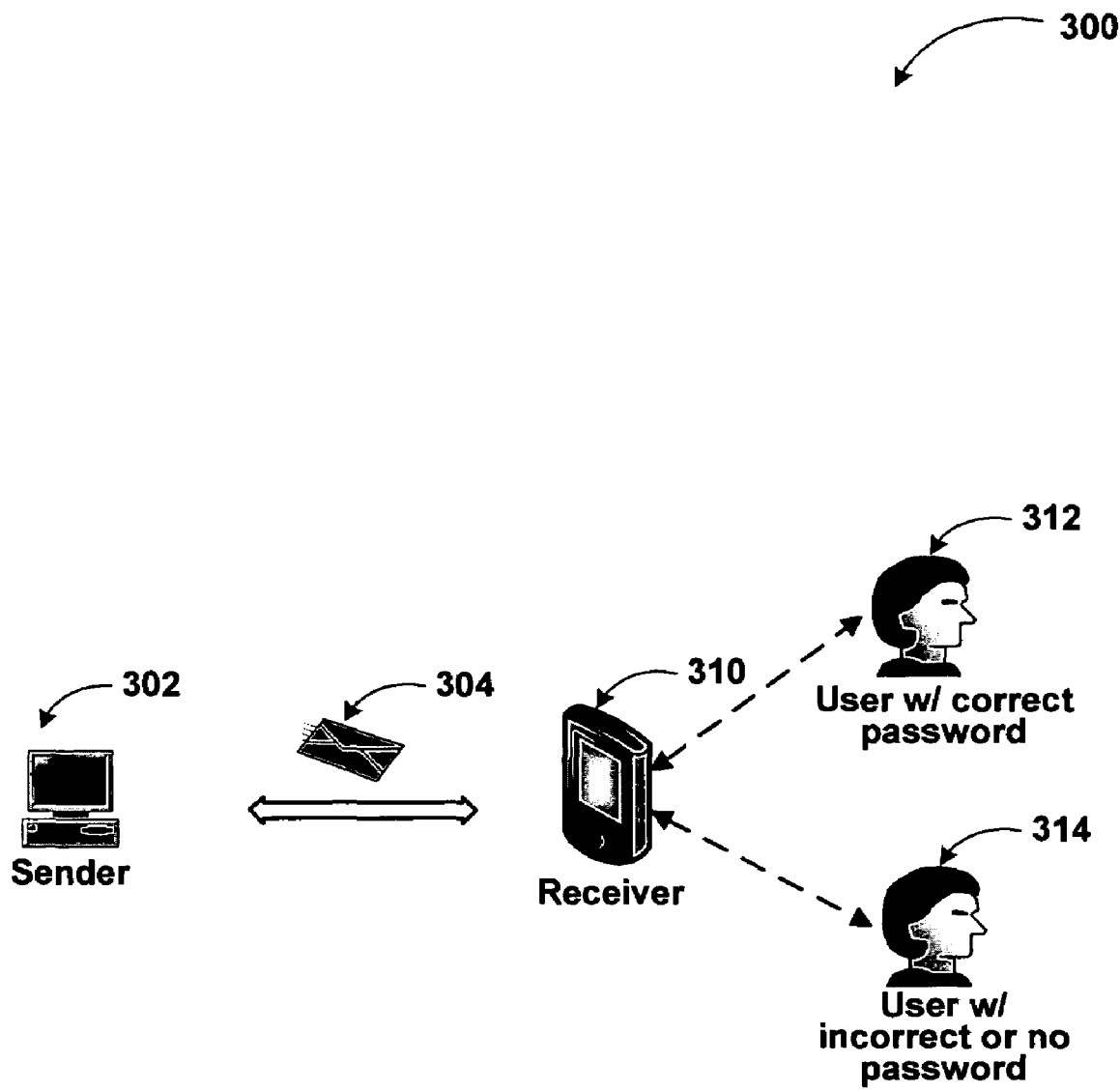
FIG. 3 illustrates a system comprising a sender and a receiver device exchanging email, where one example embodiment of password protecting transmitted content may be implemented.

FIG. 3 illustrates system 300 comprising a sender and a receiver device exchanging email, where one example embodiment of protecting transmitted content may be implemented.

Sender 302 may be a client device or application on a computing device. In one example, sender 302 may send an email including marketing material 304 to receiver device 310. Receiver device 310 may be a mobile device such as a PDA with networking capability. User 312 may be the intended recipient of marketing material 304 who needs to review the materials and forward them to certain clients under confidentiality. Marketing material 304 may include text files, graphic presentations, audio files, video files, or a combination thereof.

Sender 302 may encode marketing material 304 with a password that enables the recipient (User 312 in this example). The password may be stored within the content such as the metadata of an XML file.

The password may be associated with number of times to view and permission to store. User 312 may be allowed to view marketing material 304 five times by entering the correct password and have the option of storing them each time. After five times, marketing material 304 may be destroyed. If receiver device 310 were to be lost and found by user 314, user 314 may not access marketing material 304 without entering the correct password. Thus, marketing material 304 is protected independent of a protection mechanism provided by receiver device 310 or the email application employed.

In another embodiment, the protection mechanism may provide user 312 with permission to forward upon entry of the correct password. After accessing marketing material 304, user 312 may re-encode the material with a new password that limits the number of accesses to two and no other authorizations. This way, any clients that receive marketing material 304 from user 312 may only be able to access the material two times and not be able to save or consume them any other way.

In a further embodiment, sender 302 may encode multiple passwords onto marketing material 304 and associate each password with a different attribute such that user 312 can activate each attribute by entering the correct password for that attribute.

Figure 4:
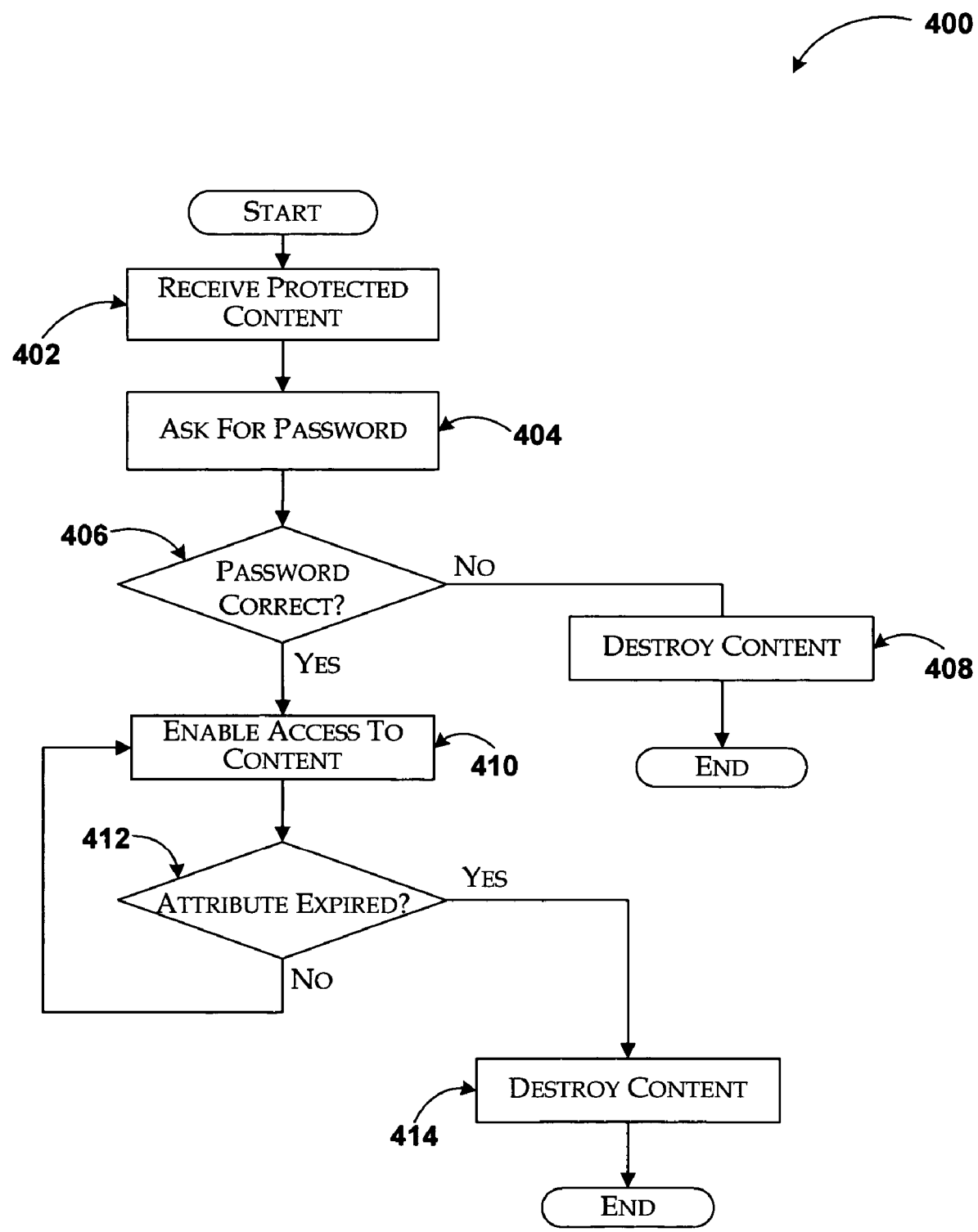
FIG. 4 is a logic flow diagram illustrating a process for password protecting an attribute of content transmitted over a network.

FIG. 4 is a logic flow diagram illustrating process 400 for protecting content exchanged over a network. Process 400 may be implemented in an exchange application such as exchange application 120 of FIG. 1. Process 400 starts at block 402 where protected content, such as an email attachment, a video stream, and the like, is received from a sender. Protected content is encoded with a password that is associated with an attribute assigned to the protected content. Processing then moves to block 404.

At block 404, a user is asked to enter the password. Processing advances to decision block 406 next. At decision block 406, a determination is made whether the entered password is correct. If the password is incorrect, processing moves to block 408. Otherwise, processing advances to block 410.

At block 408, the content is destroyed. In one embodiment, the content may be stored in a temporary folder in the receiving device and deleted. In another embodiment, the content may be stored in a volatile memory and deleted. Processing then proceeds to a calling process for further actions.

At block 410, a user is enabled to access the content. The password may be associated with an attribute of access to the content such as period of time to access, number of times to access, permission to store the content, permission to forward the content, and the like. For example, a password associated with number of times to access may enable the user to access a document only as many times as specified by the attribute, then destroy the document. Upon accessing the content, the user may perform any of these actions depending on a setup of the password. Processing proceeds to decision block 412.

At decision block 412, a determination is made whether the assigned attribute(s) has expired. For example, in case of restricted time period, the attribute expires after the specified time period for access has passed. In case of restricted number of times to access, the attribute expires once the user has accessed the content specified number of times. In case of permission to store, the attribute expires once the user stores the content on the receiving device. If the determination at decision block 412 is that the attribute has expired, processing moves to block 414. Otherwise, processing returns to block 410 for further access to the content.

At block 414, the content is destroyed as explained above, and processing proceeds to a calling process for further actions.

Process 400 is an example embodiment for illustration purposes. The invention is not limited to the flowchart blocks or the order of blocks of process 400. Other embodiments of the present invention may be implemented in another process with fewer or additional blocks and in other orders without departing from the scope and spirit of the invention.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for enforcing a receiver use restriction of a file received over a network on a receiving device, the method comprising:

receiving, from a sender via a network, a file, wherein the file includes a sender encoded password and a receiver use restriction to enforce on the file upon receipt of the file on the receiving device, wherein the receiver use restriction limits a use of the file on the receiving device, wherein the use limitation is at least one member of a group comprising: an access time limitation that provides a time period permitted to access the file, an access number limitation that provides a number of permitted accesses to the file, a storage limitation that provides restrictions for storing the file, and a forwarding limitation that provides restrictions for forwarding the file;

receiving a selection to open the file on the receiving device;

in response to receiving the selection to open the file, generating a password prompt for receiving a password;

when a received password matches the encoded password of the file, enforcing the receiver use restriction of the file to limit the use of the file on the receiving device; and when a received password does not match the encoded password of the file, instantiating a file destruction operation to destroy the file on the receiving device.

2. The computer-implemented method of claim 1, wherein the file includes multiple sender encoded passwords, wherein each of the multiple sender encoded passwords is associated with a different receiver user restriction to enforce on the file upon receipt on the receiving device.

3. The computer-implemented method of claim 1, wherein the file destruction operation includes automatically destroying the file on the receiving device.

4. The computer-implemented method of claim 1, wherein the file destruction operation includes automatically destroying the file on the receiving device after an incorrect password is received a predetermined number of times.

5. The computer-implemented method of claim 1, wherein the file destruction operation includes at least one member of a group comprising: storing the file in a temporary folder and then deleting the file from the temporary folder, and storing the file in a volatile memory and then deleting the file from the volatile memory.

6. A computer-readable storage medium having computer-executable instructions for enforcing a receiver use restriction of a file received over a network on a receiving device, the instructions comprising:

receiving a file on a receiving device, wherein the file includes a sender encoded password and a receiver use restriction to enforce on the file upon receipt of the file on the receiving device, wherein the receiver use restriction limits a use of the file on the receiving device, wherein the use limitation is at least one member of a group comprising: an access time limitation that provides a time period permitted to access the file, an access number limitation that provides a number of permitted accesses to the file, a storage limitation that provides restrictions for storing the file, and a forwarding limitation that provides restrictions for forwarding the file;

receiving a password for opening the file on the receiving device;

in response to determining that the received password matches the sender encoded password of the file, enforcing the receiver use restriction of the file to limit the use of the file on the receiving; and when the received password does not match the encoded password of the file, instantiating a file destruction operation to destroy the file on the receiving device.

7. The computer-readable storage medium of claim 6, wherein the file includes multiple sender encoded passwords, wherein each of the multiple sender encoded passwords is associated with a different receiver user restriction to enforce on the file upon receipt on the receiving device.

8. A system for enforcing a receiver use restriction of a file received over a network on a receiving device, the system comprising:

a processor; and a memory having computer executable instructions stored thereon, wherein the computer executable instructions are configured for:

receiving a file on a receiving device, wherein the file includes a sender encoded password and a receiver use restriction to enforce on the file upon receipt of the file on the receiving device, wherein the receiver use restriction limits a use of the file on the receiving device, wherein the use limitation is at least one member of a group comprising: an access time limitation that provides a time period permitted to access the file, an access number limitation that provides a number of permitted accesses to the file, a storage limitation that provides restrictions for storing the file, and a forwarding limitation that provides restrictions for forwarding the file;

receiving a password for opening the file on the receiving device;

in response to determining that the received password matches the sender encoded password of the file, enforcing the receiver use restriction of the file to limit the use of the file on the receiving device; and when the received password does not match the encoded password of the file, instantiating a file destruction operation to destroy the file on the receiving device.

9. The computer-readable storage medium of claim 6, wherein the file destruction operation includes automatically destroying the file on the receiving device.

10. The computer-readable storage medium of claim 6, wherein the file destruction operation includes automatically destroying the file on the receiving device after an incorrect password is received a predetermined number of times.

11. The computer-readable storage medium of claim 6, wherein the file destruction operation includes at least one member of a group comprising: storing the file in a temporary folder and then deleting the file from the temporary folder, and storing the file in a volatile memory and then deleting the file from the volatile memory.

12. The system of claim 8, wherein the file destruction operation includes automatically destroying the file on the receiving device.

13. The system of claim 8, wherein the file destruction operation includes automatically destroying the file on the receiving device after an incorrect password is received a predetermined number of times.

14. The system of claim 8, wherein the file destruction operation includes at least one member of a group comprising: storing the file in a temporary folder and then deleting the file from the temporary folder, and storing the file in a volatile memory and then deleting the file from the volatile memory.

* * * * *